(12) United States Patent
Tanaka et al.

(10) Patent No.: US 12,512,480 B2
(45) Date of Patent: Dec. 30, 2025

(54) ALL-SOLID-STATE BATTERY STACK

(71) Applicant: TOYOTA JIDOSHA KABUSHIKI KAISHA, Toyota (JP)

(72) Inventors: Takumi Tanaka, Miyoshi (JP); Hajime Hasegawa, Aichi-ken (JP); Satomi Yamamoto, Miyoshi (JP); Koichi Tanimoto, Nisshin (JP); Sokichi Okubo, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 16/786,473

(22) Filed: Feb. 10, 2020

(65) Prior Publication Data

US 2020/0259128 A1  Aug. 13, 2020

(30) Foreign Application Priority Data

Feb. 12, 2019  (JP) ................................. 2019-022941
Dec. 23, 2019  (JP) ................................. 2019-231368

(51) Int. Cl.
*H01M 10/0562* (2010.01)
*H01M 4/66* (2006.01)
*H01M 50/46* (2021.01)
*H01M 50/51* (2021.01)
*H01M 50/533* (2021.01)
*H01M 50/54* (2021.01)
(Continued)

(52) U.S. Cl.
CPC ........... *H01M 4/661* (2013.01); *H01M 50/46* (2021.01); *H01M 50/51* (2021.01); *H01M 50/409* (2021.01); *H01M 50/588* (2021.01)

(58) Field of Classification Search
None
See application file for complete search history.

(56) References Cited

U.S. PATENT DOCUMENTS

2006/0093922 A1*  5/2006  Kim et al. .......... H01M 50/202
                                                    429/251
2007/0196732 A1   8/2007  Tatebayashi et al.
(Continued)

FOREIGN PATENT DOCUMENTS

CN  104752774 A  7/2015
CN  108400378 A  8/2018
(Continued)

OTHER PUBLICATIONS

English translation of KR 2017/0135180 (Year: 2017).*
(Continued)

*Primary Examiner* — Yoshitoshi Takeuchi
(74) *Attorney, Agent, or Firm* — Sughrue Mion, PLLC

(57) ABSTRACT

The invention provides an all-solid-state battery stack with high voltage. The all-solid-state battery stack of the disclosure has a plurality of monopolar battery units stacked together via insulator layers. The monopolar battery unit also has a first current collector layer, a first active material layer, a solid electrolyte layer, a second active material layer, a second current collector layer, a second active material layer, a solid electrolyte layer, a first active material layer and a first current collector layer, stacked in that order. The plurality of monopolar battery units are connected together in series.

16 Claims, 8 Drawing Sheets

(51) Int. Cl.
  *H01M 50/409* (2021.01)
  *H01M 50/588* (2021.01)

(56) References Cited

U.S. PATENT DOCUMENTS

| | | | |
|---|---|---|---|
| 2009/0047575 A1* | 2/2009 | Abe | H01M 50/572 |
| | | | 429/163 |
| 2010/0330410 A1 | 12/2010 | Takahashi et al. | |
| 2011/0129718 A1 | 6/2011 | Lee | |
| 2012/0070720 A1 | 3/2012 | Aizawa et al. | |
| 2013/0295425 A1 | 11/2013 | Kwon et al. | |
| 2013/0295444 A1 | 11/2013 | Kim et al. | |
| 2014/0170468 A1 | 6/2014 | Sasaoka | |
| 2015/0188195 A1* | 7/2015 | Matsushita | H01M 10/0565 |
| | | | 29/623.5 |
| 2016/0087249 A1 | 3/2016 | Asano et al. | |
| 2017/0207440 A1 | 7/2017 | Hama et al. | |
| 2017/0222254 A1 | 8/2017 | Sakamoto et al. | |
| 2018/0026308 A1 | 1/2018 | Yamada et al. | |
| 2018/0123196 A1 | 5/2018 | Hasegawa et al. | |
| 2018/0219217 A1 | 8/2018 | Park et al. | |
| 2018/0226652 A1 | 8/2018 | Mori et al. | |
| 2018/0316049 A1 | 11/2018 | Hasegawa et al. | |
| 2019/0006652 A1 | 1/2019 | Kim | |
| 2019/0252728 A1* | 8/2019 | Shimizu | H01M 10/425 |
| 2019/0296316 A1 | 9/2019 | Wang et al. | |
| 2020/0038727 A1 | 2/2020 | Chung | |
| 2020/0044257 A1 | 2/2020 | Koo et al. | |
| 2020/0259128 A1 | 8/2020 | Tanaka et al. | |
| 2020/0280102 A1 | 9/2020 | Sakamoto et al. | |
| 2020/0343519 A1 | 10/2020 | Kim | |
| 2021/0226258 A1 | 7/2021 | Ohta et al. | |
| 2021/0242492 A1 | 8/2021 | Yamamoto et al. | |
| 2022/0094023 A1 | 3/2022 | Kamiyama et al. | |
| 2023/0275266 A1 | 8/2023 | Yamamoto et al. | |

FOREIGN PATENT DOCUMENTS

| | | | | |
|---|---|---|---|---|
| CN | 109937505 | A | 6/2019 | |
| CN | 110364673 | A | 10/2019 | |
| JP | 2004-253155 | A | 9/2004 | |
| JP | 2004303535 | A | 10/2004 | |
| JP | 2007-250319 | A | 9/2007 | |
| JP | 2008-186595 | A | 8/2008 | |
| JP | 2010-238687 | A | 10/2010 | |
| JP | 4563503 | B2 | 10/2010 | |
| JP | 2012-69268 | A | 4/2012 | |
| JP | 2012226862 | A | 11/2012 | |
| JP | 5605348 | B2 | 10/2014 | |
| JP | 2014235990 | A | 12/2014 | |
| JP | 2015-501064 | A | 1/2015 | |
| JP | 2015125872 | A | 7/2015 | |
| JP | 2017027654 | A | 2/2017 | |
| JP | 2017-45594 | A | 3/2017 | |
| JP | 2017-054704 | A | 3/2017 | |
| JP | 2017130283 | A | 7/2017 | |
| JP | 2017204377 | A | 11/2017 | |
| JP | 2018-18600 | A | 2/2018 | |
| JP | 2018073665 | A | 5/2018 | |
| JP | 2018106984 | A | 7/2018 | |
| JP | 2018129222 | A | 8/2018 | |
| JP | 2018-174074 | A | 11/2018 | |
| JP | 2018-195528 | A | 12/2018 | |
| JP | 2019-194946 | A | 11/2019 | |
| JP | 2020-6145 | A | 1/2020 | |
| KR | 10-2006-0047039 | A | 5/2006 | |
| KR | 10-2011-0061281 | A | 6/2011 | |
| KR | 10-2013-0105588 | A | 9/2013 | |
| KR | 10-2017-0135180 | A | 12/2017 | |
| KR | 2017/0135180 | | * 12/2017 | H01M 10/0562 |
| KR | 10-2019-0004150 | A | 1/2019 | |
| KR | 10-2019-0024707 | A | 3/2019 | |
| WO | 2013/137205 | A1 | 9/2013 | |
| WO | WO-2018087970 A1 | | * 5/2018 | B60K 6/46 |
| WO | 2019020724 | A1 | 1/2019 | |
| WO | 2019245137 | A1 | 12/2019 | |

OTHER PUBLICATIONS

Office Action issued Feb. 15, 2023 in U.S. Appl. No. 17/156,031.
Office Action issued Feb. 16, 2024 in U.S. Appl. No. 16/792,990.
Advisory Action issued in U.S. Appl. No. 16/792,990 Dated Jan. 11, 2024.
United States Office Action issued Oct. 17, 2023 in U.S. Appl. No. 16/792,990.
Office Action issued May 10, 2023 in U.S. Appl. No. 16/792,990.
Office Action issued Jun. 21, 2024 in U.S. Appl. No. 16/792,990.

* cited by examiner

ALL-SOLID-STATE BATTERY STACK

FIELD

The present disclosure relates to an all-solid-state battery stack.

BACKGROUND

In recent years, high-performance batteries have come to be widely used as power sources for portable devices, automobiles and the like. An example of such a high-performance battery is an all-solid-state battery stack having a bipolar structure.

An all-solid-state battery stack with a bipolar structure has a construction in which multiple structural unit cells inside the battery are connected in series, and it can therefore produce high voltage. Consequently, an all-solid-state battery stack with a bipolar structure is considered suitable for application to products that require relatively high voltage, such as automobiles.

PTL 1 discloses an all-solid-state battery stack with mutual layering of multiple bipolar battery units, each having a structure with a positive electrode active material layer on one side of a current collector layer, and a negative electrode active material layer on the other side. Such an all-solid-state battery stack can produce high voltage since the bipolar battery units are connected in series.

PTL 2 discloses an all-solid-state battery stack in which multiple bipolar battery units are mutually layered, with a construction wherein some of the bipolar battery units are covered with an insulating material.

CITATION LIST

Patent Literature

[PTL 1] Japanese Unexamined Patent Publication No. 2004-253155
[PTL 2] Japanese Unexamined Patent Publication No. 2008-186595

SUMMARY

Technical Problem

One method for obtaining a bipolar structure in an all-solid-state battery stack is, for example, to employ a structure in which a negative electrode active material layer is directly disposed on one side of a current collector layer and a positive electrode active material layer is directly disposed on the other side. When such a construction is employed, however, depending on the conditions while pressing is being carried out for consolidation of each layer during production, the differences in the stretchability of the negative electrode active material layer and positive electrode active material layer may create strain in the current collector layer, and can generate cracking in the negative electrode active material layer and positive electrode active material layer. Moreover, since such a construction uses a single current collector layer for the positive electrode collector layer and negative electrode collector layer, this limits the range of selection for the material of the current collector layer.

Another possible method for obtaining a bipolar structure is, for example, to employ a structure in which multiple structural unit cells, each having a positive electrode collector layer, a positive electrode active material layer, a solid electrolyte layer, a negative electrode active material layer and a negative electrode collector layer in that order, are stacked with their positive electrode collector layers and negative electrode collector layers laid against each other. However, when the multiple structural unit cells are stacked with their positive electrode collector layers and negative electrode collector layers laid against each other, the positive electrode collector layers and negative electrode collector layers become mutually overlaid. Thus, the volume and mass of the all-solid-state battery stack increases by the mutually overlaid current collector layers, leading to reduced energy density of the all-solid-state battery stack.

Moreover, in all-solid-state battery stacks employing these two structures, if the current collector layer fractures when the positive electrode active material layer or negative electrode active material layer is being formed during the production process, or during use, the positive electrode active material layer and negative electrode active material layer may come into direct contact and produce internal short circuiting.

Thus, while an all-solid-state battery stack with a bipolar structure is preferred for yielding high voltage, problems still remain to be solved from the viewpoint of production and structure.

The present inventors have conducted research on an all-solid-state battery stack with high voltage that can serve as a substitute for an all-solid-state battery stack with a bipolar structure.

It is therefore an object of the present disclosure to provide an all-solid-state battery stack with high voltage.

Solution to Problem

The present inventors have found that the aforementioned object can be achieved by the following means:
<Aspect 1>
An all-solid-state battery stack having a plurality of monopolar battery units stacked together via insulator layers, wherein:
the monopolar battery units each have a first current collector layer, a first active material layer, a solid electrolyte layer, a second active material layer, a second current collector layer, a second active material layer, a solid electrolyte layer, a first active material layer and a first current collector layer, stacked in that order, and
the plurality of monopolar battery units are connected together in series.
<Aspect 2>
The all-solid-state battery stack according to aspect 1, wherein for every two monopolar battery units connected in series, the pair of first current collector layers of one monopolar battery unit and the second current collector layer of the other monopolar battery unit are electrically connected.
<Aspect 3>
The all-solid-state battery stack according to aspect 1 or 2, wherein:
a first collector tab is connected to the pair of first current collector layers of the monopolar battery unit at one end in the stacking direction of the all-solid-state battery stack, and
a second collector tab is connected to the second current collector layer of the monopolar battery unit at the other end in the stacking direction.

<Aspect 4>

The all-solid-state battery stack according to aspect 3, which is housed inside an exterior body with the first collector tab and the second collector tab extending out of the exterior body.

<Aspect 5>

The all-solid-state battery stack according to any one of aspects 1 to 4, wherein the first current collector layer is a positive electrode collector layer, the first active material layer is a positive electrode active material layer, the second active material layer is a negative electrode active material layer and the second current collector layer is a negative electrode collector layer.

<Aspect 6>

The all-solid-state battery stack according to any one of aspects 1 to 5, wherein the insulator layer is an insulating polymer sheet.

<Aspect 7>

The all-solid-state battery stack according to any one of aspects 1 to 6, wherein the insulator layer contains insulating particles.

<Aspect 8>

The all-solid-state battery stack according to aspect 7, wherein the insulating particles are alumina particles.

<Aspect 9>

The all-solid-state battery stack according to any one of aspects 1 to 8, wherein either or both of the two first current collector layers forming the monopolar battery unit are bound with the insulator layer.

<Aspect 10>

The all-solid-state battery stack according to any one of aspects 1 to 9, wherein one of the two first current collector layers forming the monopolar battery unit is bound with the insulator layer, composing an insulator layer-comprising monopolar battery unit, and a plurality of insulator layer-comprising monopolar battery units are stacked together in such a manner that, for every two adjacent insulator layer-comprising monopolar battery units, the insulator layer of one insulator layer-comprising monopolar battery unit and the first current collector layer of the other insulator layer-comprising monopolar battery unit are in contact.

<Aspect 11>

The all-solid-state battery stack according to any one of aspects 1 to 9, wherein:

the two first current collector layers forming the monopolar battery unit are each bound with the insulator layer, composing an insulator layer-comprising monopolar battery unit, and a plurality of insulator layer-comprising monopolar battery units are stacked together in such a manner that the insulator layers of every two adjacent insulator layer-comprising monopolar battery units are in contact.

<Aspect 12>

The all-solid-state battery stack according to any one of aspects 1 to 11, wherein either or both of the two first current collector layers forming the monopolar battery unit are disposed on the inner side of the outer edges of the insulator layer.

<Aspect 13>

The all-solid-state battery stack according to any one of aspects 1 to 12, wherein:

for every two monopolar battery units connected in series, the first current collector layer and the second current collector layer each have protruding sections, and the protruding sections of the pair of first current collector layers of one monopolar battery unit are electrically connected to the protruding section of the second current collector layer of the other monopolar battery unit.

<Aspect 14>

The all-solid-state battery stack according to aspect 13, wherein:

(A) for each monopolar battery unit, the entirety of one of the first current collector layers including the protruding section is disposed on the inner side of the outer edges of the adjacent insulator layer, the portion of the other first current collector layer other than the protruding section is disposed on the inner side of the outer edges of the adjacent insulator layer while the protruding section protrudes from the outer edges of the adjacent insulator layer, the protruding section of one first current collector layer and the protruding section of the other first current collector layer are disposed at positions that overlap in the stacking direction of the monopolar battery unit, and the protruding sections of the pair of first current collector layers and the protruding section of the second current collector layer are disposed at positions that do not overlap in the stacking direction of the monopolar battery unit, and (B) for every two monopolar battery units connected in series, the two monopolar battery units are adjacent across an insulator layer, and the protruding sections of the pair of first current collector layers of one monopolar battery unit and the protruding section of the second current collector layer of the other monopolar battery unit are disposed at positions that overlap in the stacking direction of the monopolar battery unit and are electrically connected.

Advantageous Effects of Invention

According to the present disclosure it is possible to provide an all-solid-state battery stack with high voltage.

DESCRIPTION OF EMBODIMENTS

Embodiments of the disclosure will now be explained in detail. The disclosure is not limited to the embodiments described below, however, and various modifications may be implemented within the scope of the gist thereof.

The all-solid-state battery stack of the disclosure has a plurality of monopolar battery units stacked together via insulator layers. Each monopolar battery unit has a first current collector layer, a first active material layer, a solid electrolyte layer, a second active material layer, a second current collector layer, a second active material layer, a solid electrolyte layer, a first active material layer and a first current collector layer, stacked in that order. The plurality of monopolar battery units are connected together in series.

The all-solid-state battery stack of the disclosure has a structure with a plurality of monopolar battery units connected together in series. It can therefore exhibit high voltage while inhibiting various problems associated with bipolar structures, as explained below.

The monopolar battery unit has the same active material layers on both sides of the current collector layer. Therefore, even after pressing to consolidate each of the layers during the production process, for example, both sides of the current collector layers are less likely to differ in stretchability, and distortion of the current collector layers or cracking of the layers can be minimized. In addition, even if the current collector layers fracture during the production process or during use, internal short circuiting does not occur since active material layers of the same polarity are in contact.

Furthermore, since the monopolar battery unit can have a structure in which two structural unit cells share a single current collector layer, it is possible to use one less current collector layer, compared to a structure in which two structural unit cells are stacked together. The all-solid-state battery stack of the disclosure can therefore have increased energy density.

The number of monopolar battery units in the all-solid-state battery stack of the disclosure is not particularly restricted so long as it is more than one, i.e. two or more, and the number may be adjusted as appropriate for the purpose of use and the desired performance, including volume, voltage and capacitance, of the all-solid-state battery stack.

From the viewpoint of production efficiency of the monopolar battery units in the all-solid-state battery stack of the disclosure, preferably the first current collector layer is a positive electrode collector layer, the first active material layer is a positive electrode active material layer, the second active material layer is a negative electrode active material layer and the second current collector layer is a negative electrode collector layer.

A more specific construction for the all-solid-state battery stack of the disclosure will now be described using FIGS. 1 and 2.

Figure 1:
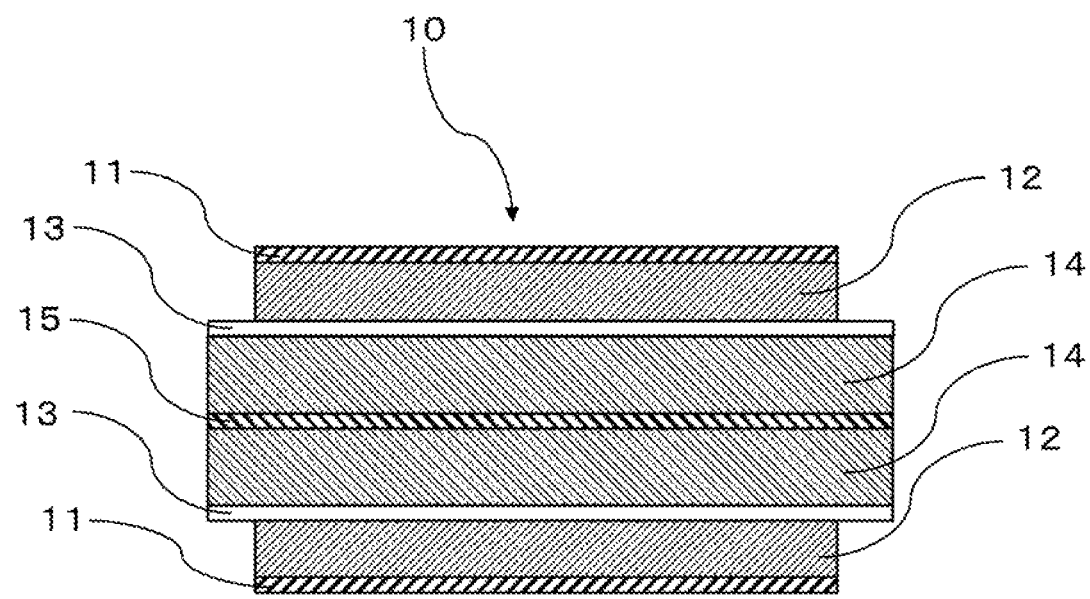
FIG. 1 is a schematic diagram showing a battery unit used to form an all-solid-state battery stack according to a first embodiment of the present disclosure.

FIG. 1 is a schematic diagram showing a battery unit used to form an all-solid-state battery stack according to the first embodiment of the disclosure.

The monopolar battery unit 10 shown in FIG. 1 has a construction with a first current collector layer 11, a first active material layer 12, a solid electrolyte layer 13, a second active material layer 14, a second current collector layer 15, a second active material layer 14, a solid electrolyte layer 13, a first active material layer 12 and a first current collector layer 11, stacked in that order. Specifically, the monopolar battery shown in FIG. 1 has a construction in which two structural unit cells, each having a first current collector layer 11, a first active material layer 12, a solid electrolyte layer 13, a second active material layer 14 and a second current collector layer 15, share the second current collector layer 15.

FIG. 1 is not intended to limit the aspects of the all-solid-state battery stack of the disclosure.

Figure 2:
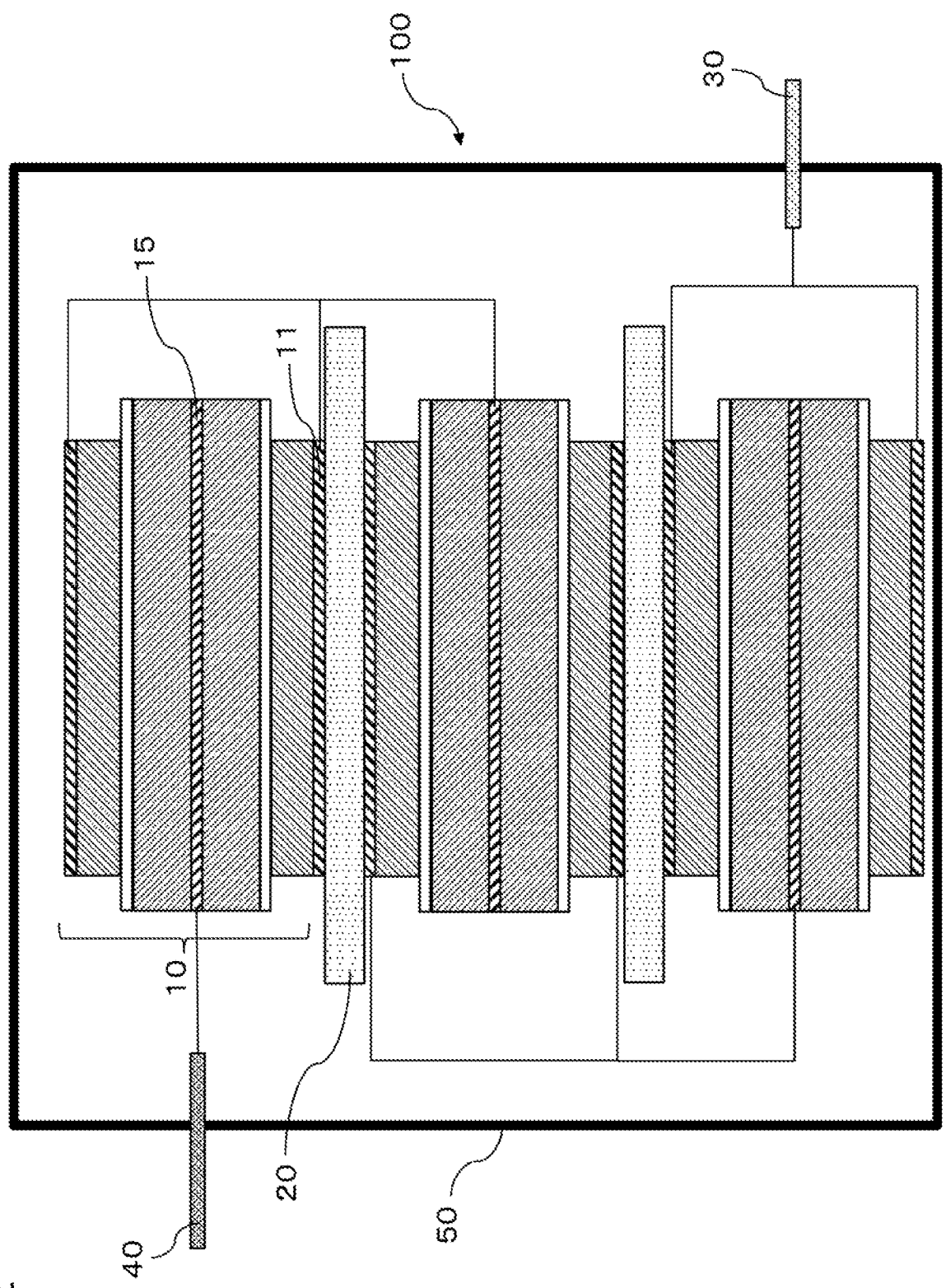
FIG. 2 is a schematic diagram showing an all-solid-state battery stack according to the first embodiment of the disclosure.

FIG. 2 is a schematic diagram showing an all-solid-state battery stack according to the first embodiment of the disclosure.

The all-solid-state battery stack 100 shown in FIG. 2 has a structure in which three monopolar battery units 10 are stacked together via insulator layers 20. For every two monopolar battery units 10 connected in series, the pair of first current collector layers 11 of one monopolar battery unit 10 and the second current collector layer 15 of the other monopolar battery unit 10 are electrically connected. Also, a first collector tab 30 is connected to the pair of first current collector layers 11 of the monopolar battery unit 10 at one end in the stacking direction of the all-solid-state battery stack 100. A second collector tab 40 is also connected to the second current collector layer 15 of the monopolar battery unit 10 at the other end. In addition, the all-solid-state battery stack 100 is housed inside an exterior body 50, with the first collector tab 30 and the second collector tab 40 extending out of the exterior body 50.

FIG. 2 is not intended to limit the aspects of the all-solid-state battery stack of the disclosure.

For the purpose of the disclosure, either or both of the two first current collector layers forming the monopolar battery unit are preferably integrally bound with the insulator layer.

In order to reduce the physical size of the all-solid-state battery stack, it is desirable for the insulator layer to be a thin as possible while still exhibiting an insulating function. However, a thin insulator layer is prone to deformation and may have difficulty retaining its shape. Depending on the manner of assembly of the all-solid-state battery stack, therefore, when the plurality of monopolar battery units are stacked together via insulator layers, some relative shifting may occur between the monopolar battery units and the insulator layers, and the first current collector layers that are facing across insulator layers may come into contact, potentially causing short circuiting.

In addition, an electrode active material used for an all-solid-state battery generally undergoes expansion and contraction in response to the insertion and desorption of lithium ions that takes place during charge-discharge, and when the electrode active material expands while the all-solid-state battery stack is constrained, the active material layer expands in the in-plane direction. During this time, the current collector layer may exude from the insulator layer and contact with the current collector layer on the opposite side across from the insulator layer, potentially resulting in short circuiting.

However, if either or both of the two first current collector layers forming the monopolar battery unit are integrally bound with the insulator layer, then when the plurality of monopolar battery units are being stacked together via insulator layers to assemble the all-solid-state battery stack it will be possible to inhibit at least any variation in the relative positional relationship between the first current collector layer and insulator layer that are integrally bound together.

Furthermore, if the active material layer is integrally bound with the current collector layer, then even when the active material layer has expanded with charge-discharge of the battery causing the current collector layer to be stretched, the current collector layer will also elongate in the in-plane direction as the active material layer expands, so that the current collector layer will not exude out from the insulator layer, thus reducing the possibility of contact between the current collector layers that are facing each other across the insulator layers, and of consequent short circuiting.

Reducing the potential for short circuiting at the ends of the current collector layers eliminates the need for the insulator layer to be made larger than the current collector layer or other members, thus allowing the physical size of the all-solid-state battery stack to be decreased.

In the all-solid-state battery stack of the disclosure, one of the two first current collector layers forming the monopolar battery unit may be bound with the insulator layer, composing an insulator layer-comprising monopolar battery unit, and a plurality of insulator layer-comprising monopolar battery units may be stacked together in such a manner that for every two adjacent insulator layer-comprising monopolar battery units, the insulator layer of one insulator layer-comprising monopolar battery unit and the first current collector layer of the other insulator layer-comprising monopolar battery unit are in contact.

Moreover, in the all-solid-state battery stack of the disclosure, the two first current collector layers forming the monopolar battery unit may be each integrally bound with the insulator layer, composing an insulator layer-comprising monopolar battery unit, and a plurality of insulator layer-comprising monopolar battery units may be stacked together in such a manner that the insulator layers of every two adjacent insulator layer-comprising monopolar battery units are in contact.

Figure 3:
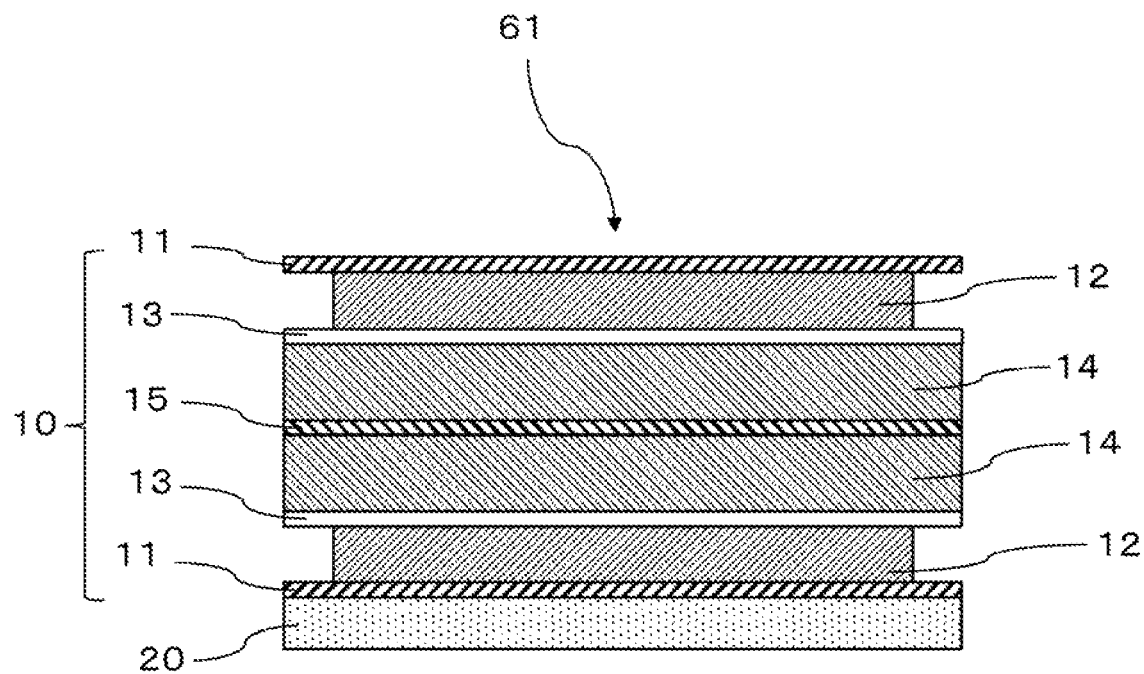
FIG. 3 is a schematic diagram showing an insulator layer-comprising monopolar battery unit used to form an all-solid-state battery stack according to a second embodiment of the disclosure.
Figure 4:
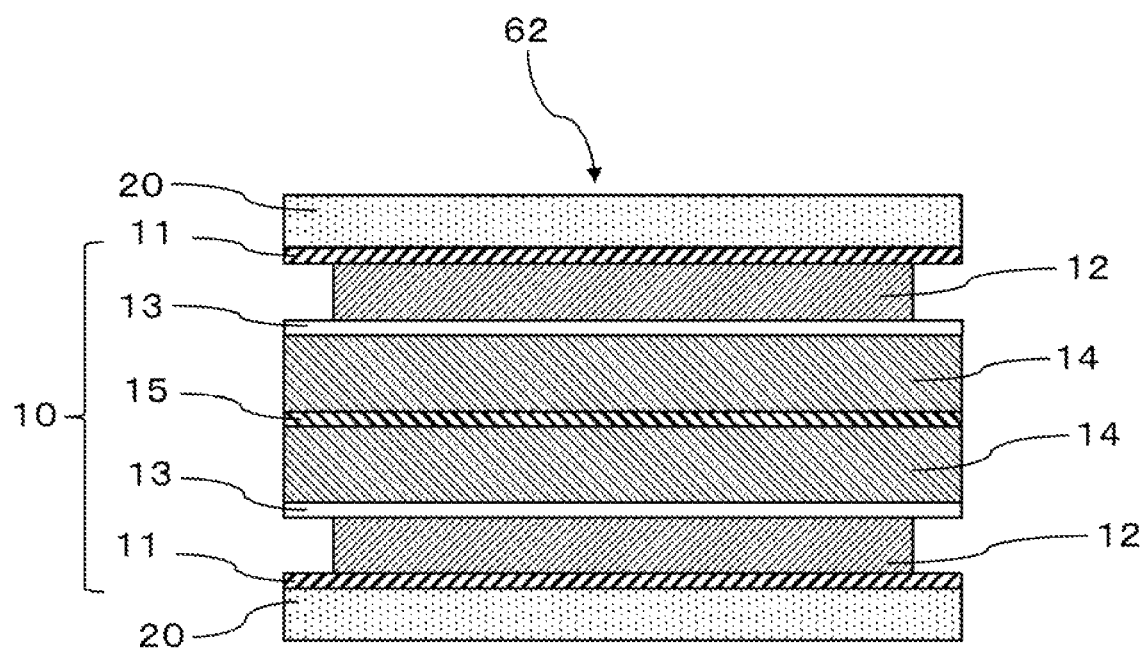
FIG. 4 is a schematic diagram showing an insulator layer-comprising monopolar battery unit used to form an all-solid-state battery stack according to a third embodiment of the disclosure.

FIGS. 3 and 4 show examples of the construction of the insulator layer-comprising monopolar battery unit of the disclosure.

FIG. 3 is a schematic diagram showing an insulator layer-comprising monopolar battery unit 61 used to form an all-solid-state battery stack according to a second embodiment of the disclosure. The insulator layer-comprising monopolar battery unit 61 has a construction in which one of the two first current collector layers 11 forming the monopolar battery unit 10 is integrally bound with the insulator layer 20.

FIG. 3 is not intended to limit the aspects of the all-solid-state battery stack of the disclosure.

FIG. 4 is a schematic diagram showing an insulator layer-comprising monopolar battery unit 62 used to form an all-solid-state battery stack according to the third embodiment of the disclosure. The insulator layer-comprising monopolar battery unit 62 has a construction in which the two first current collector layers 11 forming the monopolar battery unit 10 are each integrally bound with the insulator layer 20.

FIG. 4 is not intended to limit the aspects of the all-solid-state battery stack of the disclosure.

Furthermore, in the all-solid-state battery stack of the disclosure, for two monopolar battery units connected in series, the first current collector layer and the second current collector layer may each have a body portion and a protruding section, and the protruding sections of the pair of first current collector layers of one monopolar battery unit and the protruding section of the second current collector layer of the other monopolar battery unit may be electrically connected.

In this case, the all-solid-state battery stack of the disclosure is able to further satisfy the following conditions (A) and (B).

(A) for each monopolar battery unit, the entirety of one of the first current collector layers including the protruding section is disposed on the inner side of the outer edges of the adjacent insulator layer and the portion of the other first current collector layer other than the protruding section is disposed on the inner side of the outer edges of the adjacent insulator layer while the protruding section protrudes from the outer edges of the adjacent insulator layer, the protruding section of one of the first current collector layers and the protruding section of the other first current collector layer are disposed at positions that overlap in the stacking direction of the monopolar battery unit, and the protruding sections of the pair of first current collector layers and the protruding section of the second current collector layer are disposed at positions that do not overlap in the stacking direction of the monopolar battery unit, and (B) for two monopolar battery units connected in series, the two monopolar battery units are adjacent across an insulator layer, and the protruding sections of the pair of first current collector layers of one monopolar battery unit and the protruding section of the second current collector layer of the other monopolar battery unit are disposed at positions that overlap in the stacking direction of the monopolar battery unit and are electrically connected.

If the all-solid-state battery stack of the disclosure satisfies (A) and (B) then it is possible to electrically connect the two monopolar battery units that are connected in series, while inhibiting short circuiting caused by contact between the outer edge sections of the adjacent first current collector layers of the two monopolar battery units.

In other words, for two monopolar battery units that are connected in series, the protruding sections of the pair of first current collector layers of one monopolar battery unit and the protruding section of the second current collector layer of the other monopolar battery unit can be electrically connected by contacting them in the stacking direction of the monopolar battery unit, by welding, for instance. Furthermore, for the pair of first current collector layers of the respective monopolar battery units, since the entirety of one of the first current collector layers including the protruding section is disposed on the inner side of the outer edges of the adjacent insulator layer, this helps prevent contact between the outer edge sections of the first current collector layer contacting with one insulator layer disposed between two monopolar battery units and of the first current collector layer contacting with the other, thus helping to inhibit short circuiting.

This will now be explained in greater detail with reference to FIGS. 5 to 7.

Figure 5:
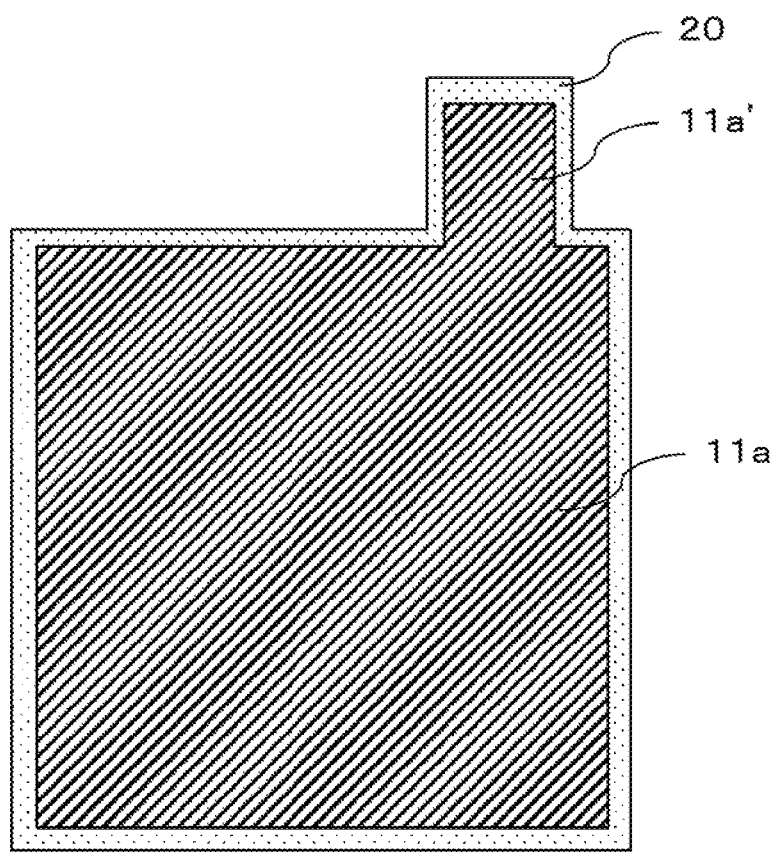
FIG. 5 is a schematic diagram showing an all-solid-state battery stack according to a fourth embodiment of the disclosure.
Figure 6:
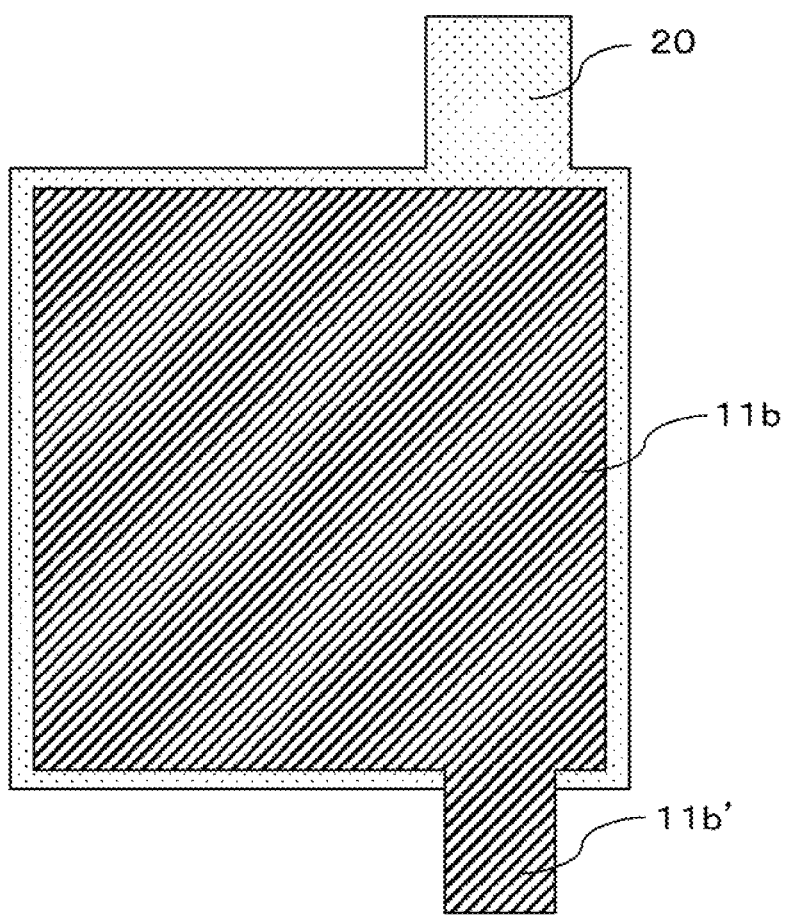
FIG. 6 is a schematic diagram showing the positional relationship between an insulator layer and one of the two first current collector layers of a battery unit used to form an all-solid-state battery stack according to the fourth embodiment of the disclosure.

In an all-solid-state battery stack 100 according to the fourth embodiment of the disclosure, as shown in FIGS. 5 and 6, for the pair of first current collector layers 11a and 11b of the respective monopolar battery units 10, the entirety of one of the first current collector layers 11a including the protruding section 11a' is disposed on the inner side of the outer edges of the adjacent insulator layer 20 (FIG. 5) whereas the portion of the other first current collector layer 11b other than the protruding section 11b' is disposed on the inner side of the outer edges of the adjacent insulator layer 20 while the protruding section 11*b'* protrudes from the outer edges of the adjacent insulator layer 20 (FIG. 6).

Figure 7:
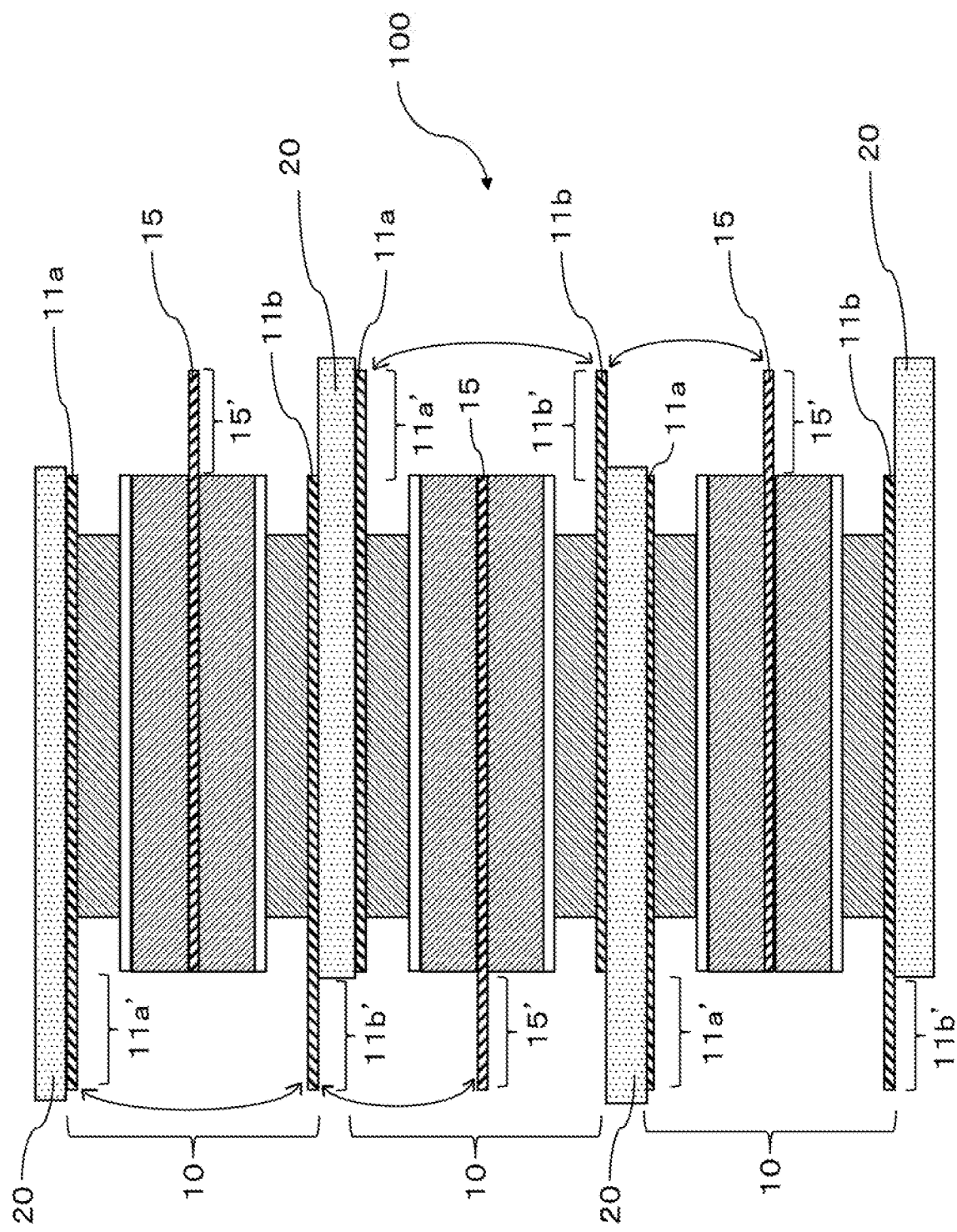
FIG. 7 is a schematic diagram showing the positional relationship between an insulator layer and the other of the two first current collector layers of a battery unit used to form an all-solid-state battery stack according to the fourth embodiment of the disclosure.

Furthermore, as shown in FIG. 7, the protruding section 11*a'* of one of the first current collector layers 11*a* and the protruding section 11*b'* of the other first current collector layer 11*b* are disposed at positions that overlap in the stacking direction of the monopolar battery unit 10, while the protruding sections 11*a'* and 11*b'* of the pair of first current collector layers 11*a* and 11*b* and the protruding section 15' of the second current collector layer 15 are disposed at positions that do not overlap in the stacking direction of the monopolar battery unit, or more specifically, they are disposed on opposite sides in the direction perpendicular to the stacking direction of the monopolar battery unit 10. Moreover, in the two monopolar battery units 10 that are connected in series, as indicated by the black arrows, the two monopolar battery units 10 are adjacent across an insulator layer 20, and the protruding sections 11*a'* and 11*b'* of the pair of first current collector layers 11*a* and 11*b* of one monopolar battery unit 10 and the protruding section 15' of the second current collector layer 15 of the other monopolar battery unit 10 are disposed at positions that overlap in the stacking direction of the monopolar battery units 10, and are electrically connected.

For the pair of first current collector layers 11*a* and 11*b* of the respective monopolar battery units 10, since the entirety of the one first current collector layer 11*a* including the protruding section 11*a'* is disposed on the inner side of the outer edges of the adjacent insulator layer 20, this helps prevent contact between the outer edge sections of the first current collector layer 11*a* contacting with one side of the insulator layer 20 disposed between the two monopolar battery units 10 and of the first current collector layer 11*b* contacting with the other side of the same.

Incidentally, the exterior body is not shown in FIG. 7 for brevity. FIGS. 5 to 7 are also not intended to limit the aspects of the all-solid-state battery stack of the disclosure.

<Monopolar Battery Unit>

The monopolar battery unit of the all-solid-state battery stack of the disclosure has a first current collector layer, a first active material layer, a solid electrolyte layer, a second active material layer, a second current collector layer, a second active material layer, a solid electrolyte layer, a first active material layer and a first current collector layer, stacked in that order.

The number of monopolar battery units in the all-solid-state battery stack of the disclosure may be from 2 to 1000. The number of monopolar battery units may be 2 or more, 3 or more, 5 or more, 10 or more, 50 or more, 100 or more, 200 or more or 500 or more, and 1000 or less, 900 or less, 800 or less, 700 or less, 600 or less or 500 or less.

<Connection Structure Between Monopolar Battery Units>

The connection structure for serial connection between the plurality of monopolar battery units is not particularly restricted, and one example is a structure in which, for every two monopolar battery units connected in series, the pair of first current collector layers of one monopolar battery unit and the second current collector layer of the other monopolar battery unit are electrically connected.

The first current collector layer and second current collector layer of two monopolar battery units connected in series may also be electrically connected. For example, the monopolar battery units may be connected by direct contact of the first current collector layer and second current collector layer, or they may be connected by a conductive member.

Examples of conductive members that may be used for connection between the first current collector layer and second current collector layer include members made of stainless steel (SUS), aluminum, copper, nickel, iron, titanium or carbon.

<Current Collector Layer>

Of the first current collector layer and second current collector layer, one is a positive electrode collector layer while the other is a negative electrode collector layer. Specifically, when the first current collector layer is a positive electrode collector layer, the second current collector layer is a negative electrode collector layer, and when the first current collector layer is a negative electrode collector layer, the second current collector layer is a positive electrode collector layer.

The material used in the current collector layers is not particularly restricted, and any one that can be used in an all-solid-state battery may be employed as appropriate. Examples for the material used in the current collector layers include, but are not limited to, stainless steel (SUS), aluminum, copper, nickel, iron, titanium and carbon. The material of the positive electrode collector layer is preferably aluminum, and the material of the negative electrode collector layer is preferably copper.

The form of the current collector layer is not particularly restricted and may be, for example, a foil, sheet, mesh or the like. A foil is preferred among these.

The current collector layer may have the same shape as the body portion and protruding sections. The body portion is the portion that includes the sides in contact with the active material layer, and it may have a shape roughly corresponding to the active material layer.

Figure 8:
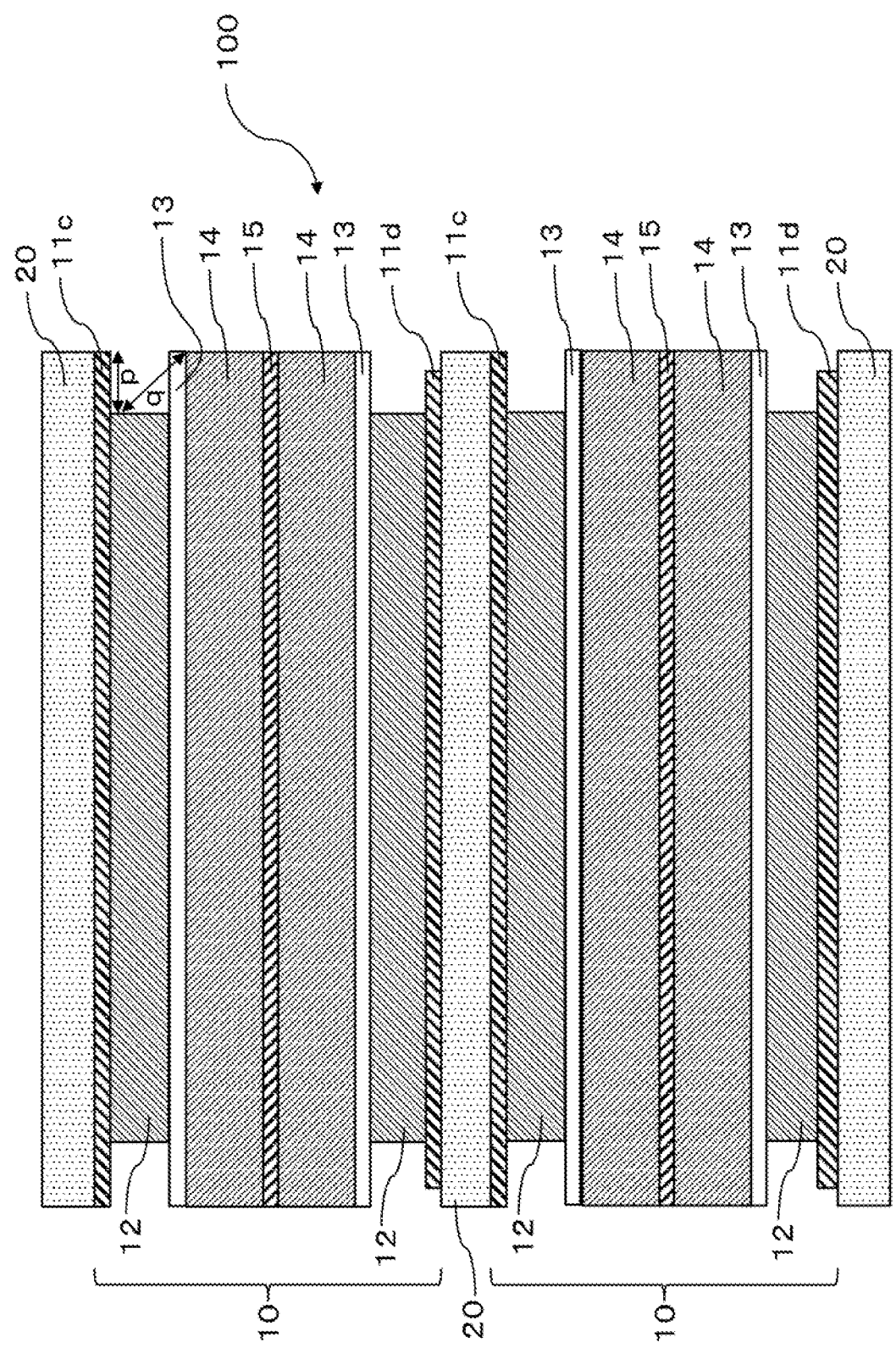
FIG. 8 is a schematic diagram showing an all-solid-state battery stack according to a fifth embodiment of the disclosure.

Also, as shown in FIG. 8, the body portion of the first current collector layer 11*c* may extend out from the outsides of the outer edges of the active material layer in the stacking direction of the monopolar battery unit. That is, the first active material layer 12 may be disposed inside the outer edges of the body portion. According to this aspect, the length p of the portion of the body portion extending from the outsides of the outer edges of the first active material layer 12 is preferably smaller than the minimum length q between the furthest edge of the first current collector layer 11*c* and the furthest edge of the second active material layer 14, from the viewpoint of inhibiting short circuiting inside the monopolar battery unit.

If the length p of the portion of the body portion of the first current collector layer 11*c* extending from the outsides of the outer edges of the first active material layer 12 is within this range, then even when the first current collector layer 11*c* bends toward the second active material layer 14 side it will not contact with the second active material layer 14, and therefore short circuiting inside the monopolar battery unit can be inhibited.

Figure 9:
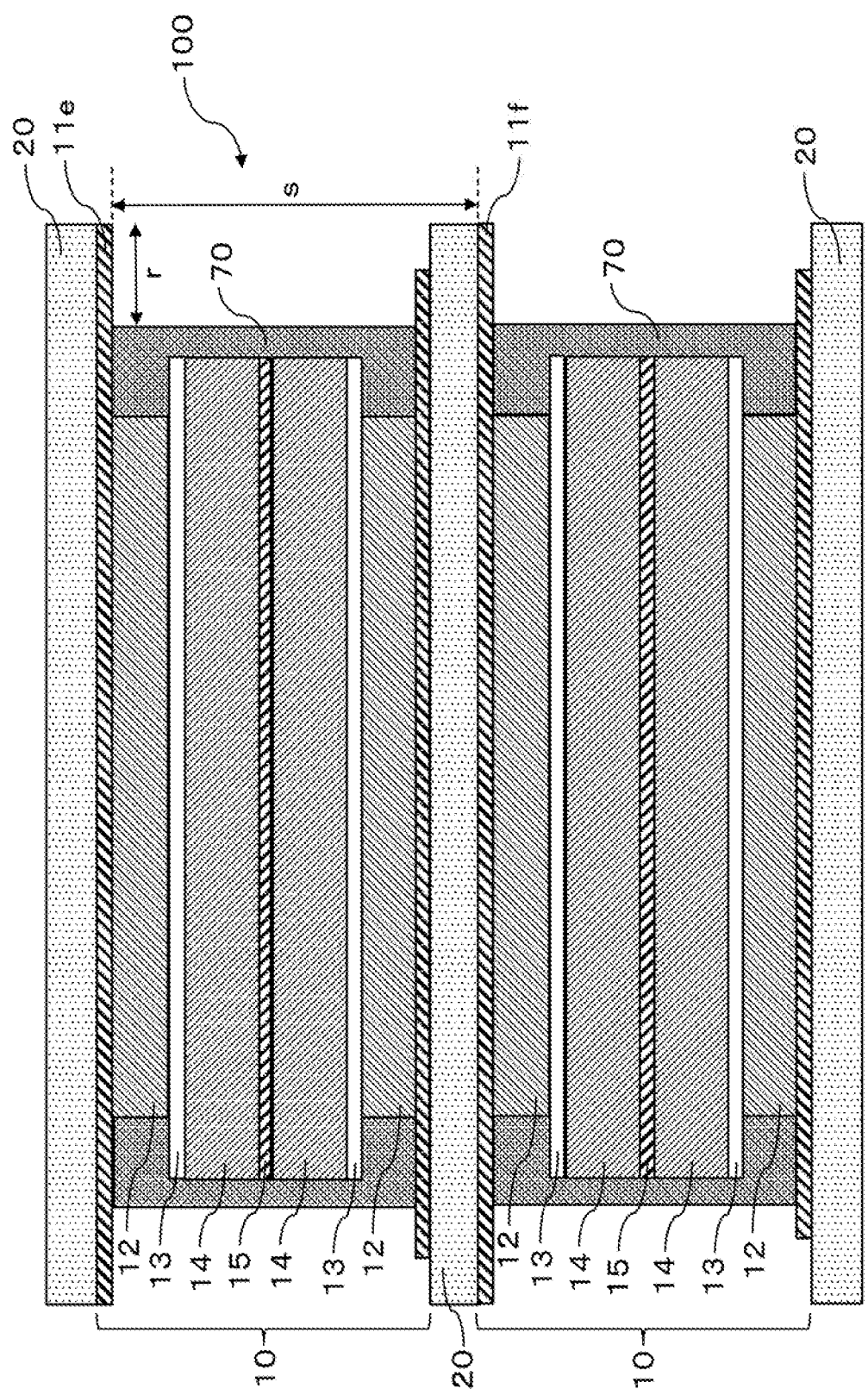
FIG. 9 is a schematic diagram showing an all-solid-state battery stack according to a sixth embodiment of the disclosure.

When the all-solid-state battery stack has an end insulating member 70 disposed covering the outer perimeters of the second active material layer and the second current collector layer, as shown in FIG. 9, then from the viewpoint of inhibiting short circuiting between two adjacent monopolar battery units it is preferred for the length r of the portion of the first current collector layer 11*c* that extends from the outsides of the outer edges of the end insulating member 70 to be smaller than the minimum length s between the first current collector layer 11*e* of one monopolar battery unit and the other first current collector layer 11*f* in the stacking direction of the monopolar battery unit.

If the length r of the portion of the first current collector layer 11*c* extending from the outsides of the outer edges of the end insulating member 70 is within this range, then even when the first current collector layer 11c bends toward the other first current collector layer 11f side it will not contact with the other first current collector layer 11f, and therefore short circuiting between two adjacent monopolar battery units can be inhibited.

The protruding sections are the portions protruding from the body portion, and they are portions for serial connection between the plurality of monopolar battery units.

Incidentally, the exterior body is not shown in FIGS. 8 and 9 for brevity. FIGS. 8 and 9 are also not intended to limit the aspects of the all-solid-state battery stack of the disclosure.

<Active Material Layer>

Of the first active material layer and second active material layer, one is a positive electrode active material layer and the other is a negative electrode active material layer. Specifically, when the first active material layer is a positive electrode active material layer, the second active material layer is a negative electrode active material layer, and when the first active material layer is a negative electrode active material layer, the second active material layer is a positive electrode active material layer.

(Positive Electrode Active Material Layer)

The positive electrode active material layer includes at least a positive electrode active material, and it preferably further includes the solid electrolyte described below. In addition, it may include additives used in positive electrode active material layers for all-solid-state batteries, such as conductive aids and binders, for example, depending on the application and the purpose of use.

The material of the positive electrode active material is not particularly restricted. Examples for the positive electrode active material include, but are not limited to, heterogenous element-substituted Li—Mn spinel having a composition represented by lithium cobaltate ($LiCoO_2$), lithium nickelate ($LiNiO_2$), lithium manganate ($LiMn_2O_4$), $LiCo_{1/3}Ni_{1/3}Mn_{1/3}O_2$ and $Li_{1+x}Mn_{2-x-y}M_yO_4$ (where M is one or more metal elements selected from among Al, Mg, Co, Fe, Ni and Zn).

The conductive aid is not particularly restricted. For example, the conductive aid may be, but is not limited to, a carbon material such as VGCF (Vapor Grown Carbon Fibers) or carbon nanofibers, or a metal material.

The binder is also not particularly restricted. Examples for the binder include, but are not limited to, materials such as polyvinylidene fluoride (PVdF), carboxymethyl cellulose (CMC), butadiene rubber (BR) and styrene-butadiene rubber (SBR), or combinations thereof.

(Negative Electrode Active Material Layer)

The negative electrode active material layer includes at least a negative electrode active material, and it preferably further includes the solid electrolyte described above. In addition, it may include additives used in negative electrode active material layers of lithium ion secondary batteries, such as the aforementioned conductive aids and binders, for example, depending on the application and the purpose of use. The conductive aid and binder may be selected with reference to the above description for the positive electrode active material layer.

The material for the negative electrode active material is not particularly restricted, and it may be lithium metal, or any material capable of occluding and releasing metal ions such as lithium ions. Examples of materials capable of occluding and releasing metal ions such as lithium ion include, but are not limited to, alloy-based negative electrode active materials and carbon materials, as negative electrode active materials.

Alloy-based negative electrode active materials are not particularly restricted, and examples include Si alloy-based negative electrode active materials and Sn alloy-based negative electrode active materials. Si alloy-based negative electrode active materials include silicon, silicon oxides, silicon carbides, silicon nitrides, and their solid solutions. A Si alloy-based negative electrode active material may also include elements other than silicon, such as Fe, Co, Sb, Bi, Pb, Ni, Cu, Zn, Ge, In, Sn and Ti, for example. Sn alloy-based negative electrode active materials include tin, tin oxides, tin nitrides, and their solid solutions. A Sn alloy-based negative electrode active material may also include elements other than tin, such as Fe, Co, Sb, Bi, Pb, Ni, Cu, Zn, Ge, In, Ti and Si, for example. Si alloy-based negative electrode active materials are preferred among these.

Carbon materials are not particularly restricted and include hard carbon, soft carbon and graphite, for example.

<Solid Electrolyte Layer>

The solid electrolyte layer includes at least a solid electrolyte. The solid electrolyte layer may include a binder or the like if necessary, in addition to the solid electrolyte mentioned above. The binder may be selected with reference to the above description for the positive electrode active material layer.

The material of the solid electrolyte is not particularly restricted, and it may be any material that can be used as a solid electrolyte for an all-solid-state battery. For example, the solid electrolyte may be a sulfide solid electrolyte, an oxide solid electrolyte or a polymer electrolyte, although this is not limitative.

Examples of sulfide solid electrolytes include, but are not limited to, sulfide-based amorphous solid electrolytes, sulfide-based crystalline solid electrolytes and argyrodite solid electrolytes. Specific examples of sulfide solid electrolytes include, but are not limited to, $Li_2S$—$P_2S_5$ ($Li_7P_3S_{11}$, $Li_3PS_4$, $Li_8P_2S_9$), $Li_2S$—$SiS_2$, $LiI$—$Li_2S$—$SiS_2$, $LiI$—$Li_2S$—$P_2S_5$, $LiI$—$LiBr$—$Li_2S$—$P_2S_5$, $Li_2S$—$P_2S_5$—$GeS_2$ ($Li_{13}GeP_3S_{16}$, $Li_{10}GeP_2S_{12}$), $LiI$—$Li_3PO_4$—$P_2S_5$ and $Li_{7-x}PS_{6-x}Cl_x$, as well as combinations thereof.

Examples of oxide solid electrolytes include, but are not limited to, $Li_7La_3Zr_2O_{12}$, $Li_{7-x}La_3Zr_{1-x}Nb_xO_{12}$, $Li_{7-3x}La_3Zr_{2/3-x}O_{12}$, $Li_{3x}La_{2/3-x}TiO_3$, $Li_{1+x}Al_xTi_{2-x}(PO_4)_3$, $Li_{1+x}Al_xGe_{2-x}(PO_4)_3$, $Li_3PO_4$ and $Li_{3+x}PO_{4-x}N_x$(LiPON).

Polymer electrolytes include, but are not limited to, polyethylene oxide (PEO) and polypropylene oxide (PPO), and their copolymers.

The solid electrolyte may be glass or crystallized glass (glass ceramic).

<Insulator Layer>

The insulator layer may be a layer made of any material that can ensure insulation between mutually stacked monopolar battery units. The insulator layer may be an insulating polymer sheet, for example. Examples of insulating polymer sheets include, but are not limited to, polyimide and polyethylene terephthalate (PET).

The insulator layer may also contain insulating particles as a material capable of ensuring the insulating property. Examples of insulating particles include but are not limited to alumina particles.

From the viewpoint of further improving the insulating property of each monopolar battery unit, at least one of the two first current collector layers forming the monopolar battery unit is preferably disposed on the inner side from the outer edges of the insulator layer. The method of disposing the first current collector layer on the inner side from the outer edges of the insulator layer may be by making the area of the insulator layer larger than the area of the first current collector layer, but there is no limitation to such a method.

The insulator layer preferably has a smaller Young's modulus than the first current collector layer. If the Young's modulus of the insulator layer is smaller than that of the first current collector layer, then when local pressure has been applied within the all-solid-state battery stack, during charge-discharge of the all-solid-state battery stack, for example, the difference in pressure between the layers of the monopolar battery unit can be reduced in the in-plane direction. This will allow the input/output characteristic and durability of the all-solid-state battery stack to be improved.

The Young's modulus of the insulator layer and first current collector layer can be measured by a compression test (JIS K7181), for example.

<Collector Tabs>

The all-solid-state battery stack of the disclosure may be connected with collector tabs. More specifically, a first collector tab may be connected to the pair of first current collector layers of the monopolar battery unit at one end in the stacking direction of the all-solid-state battery stack of the disclosure, while a second collector tab may be connected to the second current collector layer of the monopolar battery unit at the other end in the stacking direction.

The first collector tab and second collector tab are collector tabs with the same polarity as the first current collector layer and second current collector layer, respectively. For example, when the first current collector layer is a positive electrode collector layer and the second current collector layer is a negative electrode collector layer, the first collector tab is a positive electrode collector tab and the second collector tab is a negative electrode collector tab.

The material used for the collector tabs is not particularly restricted, and any one that can be used in an all-solid-state battery may be employed as appropriate. Examples for the material used in the current collector layers include, but are not limited to, stainless steel (SUS), aluminum, copper, nickel, iron, titanium and carbon. The material of the positive electrode collector tab is preferably aluminum, and the material of the negative electrode collector tab is preferably copper.

<Exterior Body>

The all-solid-state battery stack of the disclosure may be housed in an exterior body. More specifically, the all-solid-state battery stack of the disclosure may be housed inside an exterior body, with the first collector tab and the second collector tab extending out of the exterior body.

The exterior body that can house the all-solid-state battery stack of the disclosure may have any desired structure allowing the all-solid-state battery stack to be sealed.

When the all-solid-state battery stack uses materials that deteriorate by contact with oxygen or water vapor in the air, the material of the exterior body is preferably a material that is non-permeable to oxygen or water vapor in the air, and for example, it may be a laminated sheet having a metal layer made of iron, copper, aluminum, brass, stainless steel, steel or the like, and a sealant material layer made of polypropylene, polyethylene, polystyrene, polyvinyl chloride or the like.

EXAMPLES

Example 1

Three monopolar battery units were fabricated, each having a positive electrode collector layer, a positive electrode active material layer, a solid electrolyte layer, a negative electrode active material layer, a negative electrode collector layer, a negative electrode active material layer, a solid electrolyte layer, a positive electrode active material layer and a positive electrode collector layer, stacked in that order.

The monopolar battery units were stacked together with insulating polymer films sandwiched between them. The positive electrode collector layers and negative electrode collector layers of the respective stacked monopolar battery units were connected as shown in FIG. 2, to complete an all-solid-state battery stack for Example 1.

The all-solid-state battery stack of Example 1 was subjected to 3 alternating cycles of charge with a 1/3 C constant current and 1/100 C constant voltage and discharge with a 1/3 C constant current and 1/100 C constant voltage, to confirm its function as a battery. Under these charge-discharge conditions, the all-solid-state battery stack of Example 1 had an initial discharge voltage of about 7.5 V. The capacity retention after 3 cycles was approximately 99.8%. The theoretical initial discharge voltage for each monopolar battery unit alone was 2.8 V.

REFERENCE SIGNS LIST

10 Monopolar battery unit
11 First current collector layer
12 First active material layer
13 Solid electrolyte layer
14 Second active material layer
15 Second current collector layer
20 Insulator layer
30 First collector tab
40 Second collector tab
50 Exterior body
100 All-solid-state battery stack

The invention claimed is:

1. An all-solid-state battery stack comprising:
 a plurality of monopolar battery units, each adjacent monopolar battery unit stacked together via insulator layers, wherein:
 the monopolar battery units each have a first current collector layer, a first active material layer, a solid electrolyte layer, a second active material layer, a second current collector layer, a second active material layer, a solid electrolyte layer, a first active material layer and a first current collector layer, stacked in that order,
 the plurality of monopolar battery units are connected together in series,
 either or both of the two first current collector layers forming the monopolar battery unit are integrally bound with the insulator layer,
 an end insulating member is disposed covering outer perimeters of the second active material layer and the second current collector layer, and
 the first current collector layer is disposed on one side of the insulation layer and another first current collector is disposed on another side of the insulator layer
 wherein the first current collector layer comprises a body portion and an extending portion extending outward from the body portion beyond an outermost edge of the first active material layer, and
 wherein a length of the extending portion is smaller than a minimum length between the outermost edge of the body portion of the first current collector layer and the outermost edge of the second active material layer.

2. The all-solid-state battery stack according to claim 1, wherein for every two monopolar battery units connected in series, the pair of first current collector layers of one monopolar battery unit and the second current collector layer of the other monopolar battery unit are electrically connected.

3. The all-solid-state battery stack according to claim 1, wherein:
a first collector tab is connected to the pair of first current collector layers of the monopolar battery unit at one end in the stacking direction of the all-solid-state battery stack, and
a second collector tab is connected to the second current collector layer of the monopolar battery unit at the other end in the stacking direction.

4. The all-solid-state battery stack according to claim 3, which is housed inside an exterior body with the first collector tab and the second collector tab extending out of the exterior body.

5. The all-solid-state battery stack according to claim 1, wherein:
the first current collector layer is a positive electrode collector layer, the first active material layer is a positive electrode active material layer, the second active material layer is a negative electrode active material layer and the second current collector layer is a negative electrode collector layer.

6. The all-solid-state battery stack according to claim 1, wherein the insulator layer is an insulating polymer sheet.

7. The all-solid-state battery stack according to claim 1, wherein the insulator layer contains insulating particles.

8. The all-solid-state battery stack according to claim 7, wherein the insulating particles are alumina particles.

9. The all-solid-state battery stack according to claim 1, wherein one of the two first current collector layers forming the monopolar battery unit is bound with the insulator layer, composing an insulator layer-comprising monopolar battery unit, and
a plurality of insulator layer-comprising monopolar battery units are stacked together in such a manner that, for every two adjacent insulator layer-comprising monopolar battery units, the insulator layer of one insulator layer-comprising monopolar battery unit and the first current collector layer of the other insulator layer-comprising monopolar battery unit are in contact.

10. The all-solid-state battery stack according to claim 1, wherein:
the two first current collector layers forming the monopolar battery unit are each bound with the insulator layer, composing an insulator layer-comprising monopolar battery unit, and
a plurality of insulator layer-comprising monopolar battery units are stacked together in such a manner that the insulator layers of every two adjacent insulator layer-comprising monopolar battery units are in contact.

11. The all-solid-state battery stack according to claim 1, wherein either or both of the two first current collector layers forming the monopolar battery unit are disposed on the inner side of the outer edges of the insulator layer.

12. The all-solid-state battery stack according to claim 1, wherein:
for every two monopolar battery units connected in series,
the first current collector layers and the second current collector layer each have a body portion and a protruding section, and
the protruding sections of the pair of first current collector layers of one monopolar battery unit are electrically connected to the protruding section of the second current collector layer of the other monopolar battery unit.

13. The all-solid-state battery stack according to claim 12, wherein:
(A) for each monopolar battery unit,
the entirety of one of the first current collector layers including the protruding section is disposed on the inner side of the outer edges of the adjacent insulator layer,
the portion of the other first current collector layer other than the protruding section is disposed on the inner side of the outer edges of the adjacent insulator layer while the protruding section protrudes from the outer edges of the adjacent insulator layer,
the protruding section of one first current collector layer and the protruding section of the other first current collector layer are disposed at positions that overlap in the stacking direction of the monopolar battery unit, and
the protruding sections of the pair of first current collector layers and the protruding section of the second current collector layer are disposed at positions that do not overlap in the stacking direction of the monopolar battery unit, and
(B) for every two monopolar battery units connected in series,
the two monopolar battery units are adjacent across an insulator layer, and
the protruding sections of the pair of first current collector layers of one monopolar battery unit and the protruding section of the second current collector layer of the other monopolar battery unit are disposed at positions that overlap in the stacking direction of the monopolar battery unit and are electrically connected.

14. The all-solid-state battery stack according to claim 1, wherein the length of the extending portion is smaller than the minimum length between the outermost edge of the first active material layer and the outermost edge of the solid electrolyte layer.

15. The all-solid-state battery stack according to claim 1, wherein a Young's modulus of the insulator layer is smaller than the Young's modulus than the first current collector layer.

16. The all-solid-state battery stack according to claim 1, wherein:
the first current collector layer further comprises a protruding section protruding from the body portion in a direction perpendicular to the stacking direction, and
the insulating layer comprises a body portion and a protruding section protruding from the body portion of the insulating layer in the direction perpendicular to the stacking direction, wherein,
the body portion of the first current collector layer disposed on the one side of the insulator layer is disposed on an inner side of the outer edges of the body portion of the insulator layer and the protruding section of the first current collector layer is disposed on the inner side of the outer edges of the protruding section of the insulator layer, and
the body portion of the first current collector layer disposed on the another side of the insulator layer is disposed on the inner side of the outer edges of the body portion of the insulator layer and the protruding section of the insulator layer is disposed on the inner side of the outer edges of the protruding section of first current collector layer.

\* \* \* \* \*